Dec. 17, 1929.                F. J. LEATHER                1,740,025
                  HOOD FOR AUTOMOBILES AND OTHER VEHICLES
                       Filed Nov. 8, 1926       3 Sheets-Sheet 1
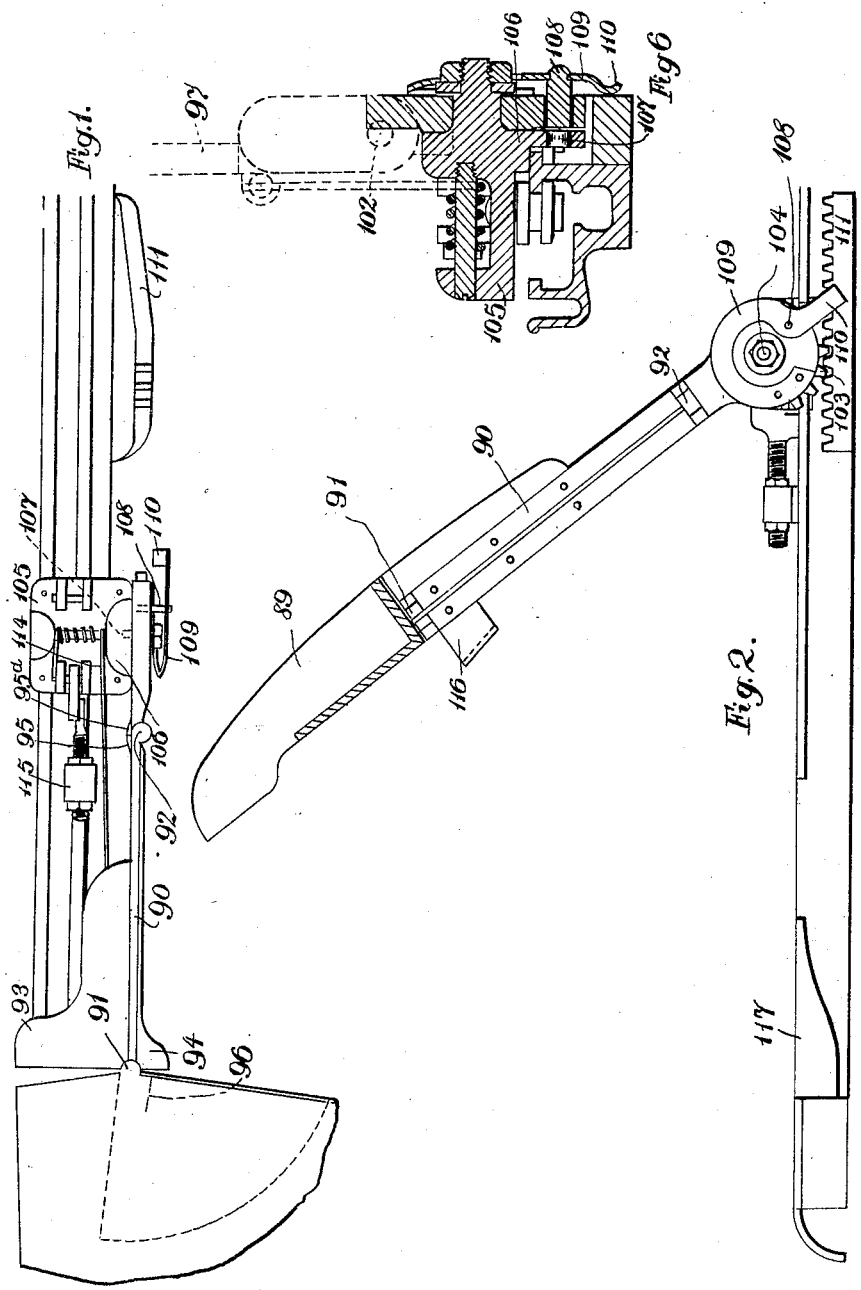
Inventor
Felix J. Leather
By Marks + Clerk
         Attys.

Dec. 17, 1929. F. J. LEATHER 1,740,025
HOOD FOR AUTOMOBILES AND OTHER VEHICLES
Filed Nov. 8, 1926  3 Sheets-Sheet 2

Inventor
Felix J. Leather
By Marks & Clerk
Attys.

Dec. 17, 1929.   F. J. LEATHER   1,740,025
HOOD FOR AUTOMOBILES AND OTHER VEHICLES
Filed Nov. 8, 1926   3 Sheets-Sheet 3

Inventor
Felix J. Leather
By Marks & Clark
Attys.

Patented Dec. 17, 1929

1,740,025

UNITED STATES PATENT OFFICE

FELIX JOHN LEATHER, OF LONDON, ENGLAND

HOOD FOR AUTOMOBILES AND OTHER VEHICLES

Application filed November 8, 1926, Serial No. 147,123, and in Great Britain November 16, 1925.

This invention relates to hoods for automobiles and other vehicles of the kind in which cant rails are secured to the body of the vehicle, extending from the rear to the front thereof, and a plurality of hood sticks, cross-bars, or bows forming a support for a flexible covering material are provided, each of said hood sticks, cross-bars or bows being supported upon cant rails when the hood is raised, and endless flexible members, preferably actuated from the driver's seat, are employed for raising and lowering the hood.

On æsthetic grounds it is desirable to arrange the cant rails directly above the sides of the body, and on similar grounds it is desirable that the hood when lowered shall be housed within the body or, at least, when lowered shall not overhang the rear panel.

Further, in the majority of cases, the width of the body varies, being less at the forward end than at the rear and it is desirable that the cant rails shall follow the sweep or shape of the body in plan.

Moreover, it is most desirable or even essential that the hood should be substantially free from rattle when erected.

These and other considerations give rise to a number of difficulties in the design of a hood of the character in question.

The invention comprises the provision of jointed connections between the peak or forward flap and arms extending therefrom to the means adapted to rotate the peak or flap to bring it into the desired position in raising or lowering the hood.

Preferably these joints are furnished with stops so that the several sections of the arms can only move to the extent necessitated by the difference in distance between the forward portions and rear portions of the cant rails.

Thus, in accordance with the invention, a universal or semi-universal joint may be provided between the slippers or shoes with which the peak or flap is pivotally connected and the fore edge of the peak which normally will be formed of wood or like material and be a substantially rigid member. Thus, for instance, the shoe may be connected with the fore edge of the peak by means of arms pivotally connected about an axis which is vertical when the hood is in the raised position and is also pivotally connected with the fore edge of the peak about an axis which is horizontal when the hood is in the like position.

Preferably also at the last-mentioned point the arm is connected with the fore edge of the hood by means permitting the arm to move relatively to the said portion of the peak about a vertical axis.

A further feature of the invention comprises the provision of means on the flap or peak of the hood engaging means upon the cant rail adapted to ensure substantially rigid engagement between the peak or flap of the hood and the cant rail. Thus, for instance, a lug of L shape or other convenient form may be furnished on an arm connecting the fore edge of the peak or flap with one of the slippers or shoes and a member furnished with an inclined plane adapted to be engaged by the lug may be provided on the cant rail.

Optionally springs may be associated with the arms connecting the fore edge of the peak or flap to their slippers or shoes in such manner as to constrain or assist in constraining the flap to move in an upward direction about its axis.

Conveniently, according to the present invention, a clutch member may be associated with the pivotal connection of the peak or flap of the hood in such manner as to ensure that when the peak is raised it is secured in the raised position while the hood is being lowered.

Conveniently a toothed sector is arranged to engage with a rack in order to ensure the desired rotational motion of the flap or peak of the hood in order to bring it into position when the hood is fully raised and to secure that its fore edge rises in lowering the hood.

Conveniently, in accordance with the present invention, the rack member is provided with an inclined surface adapted to cooperate with an element associated with the clutch member in such manner as to ensure the operation of the clutch member to release the peak or flap when the toothed sector engages the rack, thus permitting the toothed sector as it travels over the rack in raising the hood to rotate the peak or flap in a forward or downward direction.

In one construction in accordance with the invention a clutch member of the pin and socket type is employed, the pin being associated with a spring furnished with an extension adapted to co-operate with an inclined surface associated with the rack in order to secure the withdrawal of the pin from the socket at the appropriate time.

The socket will normally be formed upon a slipper or shoe engaging the cant rail and with this shoe tensioning means for the flexible member connected to the shoes associated with the several hood sticks may be provided.

Certain constructions in accordance with the invention are illustrated by way of example in the accompanying drawings, in which:—

Figure 1 is a plan view of one form of the peak or forward part of the hood in the fully lowered position;

Figure 2 is a side view of the peak shown in Figure 1 whilst it is in a partially lowered position;

Figure 6 is a section taken through the axial member shown in Figure 5, and

Figure 3:
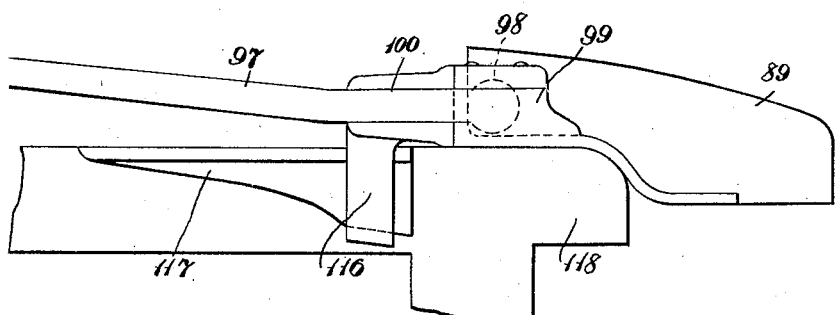
Figures 3 and 4 are side and plan views respectively showing a method of attaching the peak to the arms in a modified arrangement, which has several common features—indicated by common references—with the construction shown in Figures 1 and 2.
Figure 4:
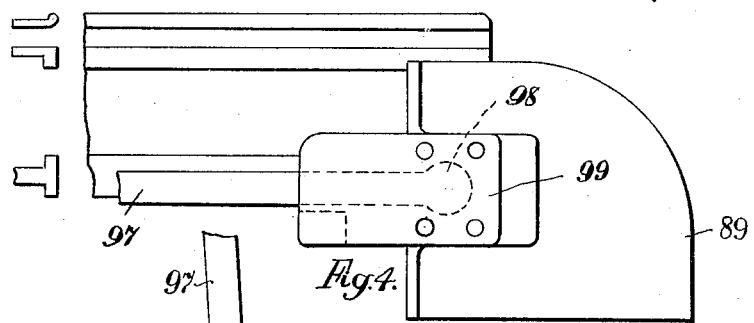
Figure 5:
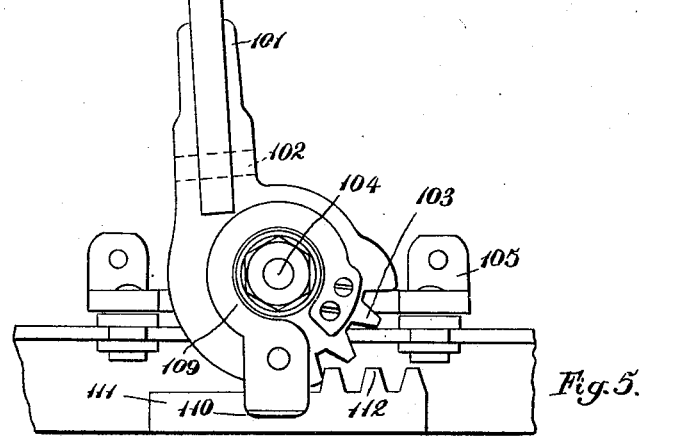
Figure 5 is a side elevation of the pivot end of the modified arrangement.
Figure 7:
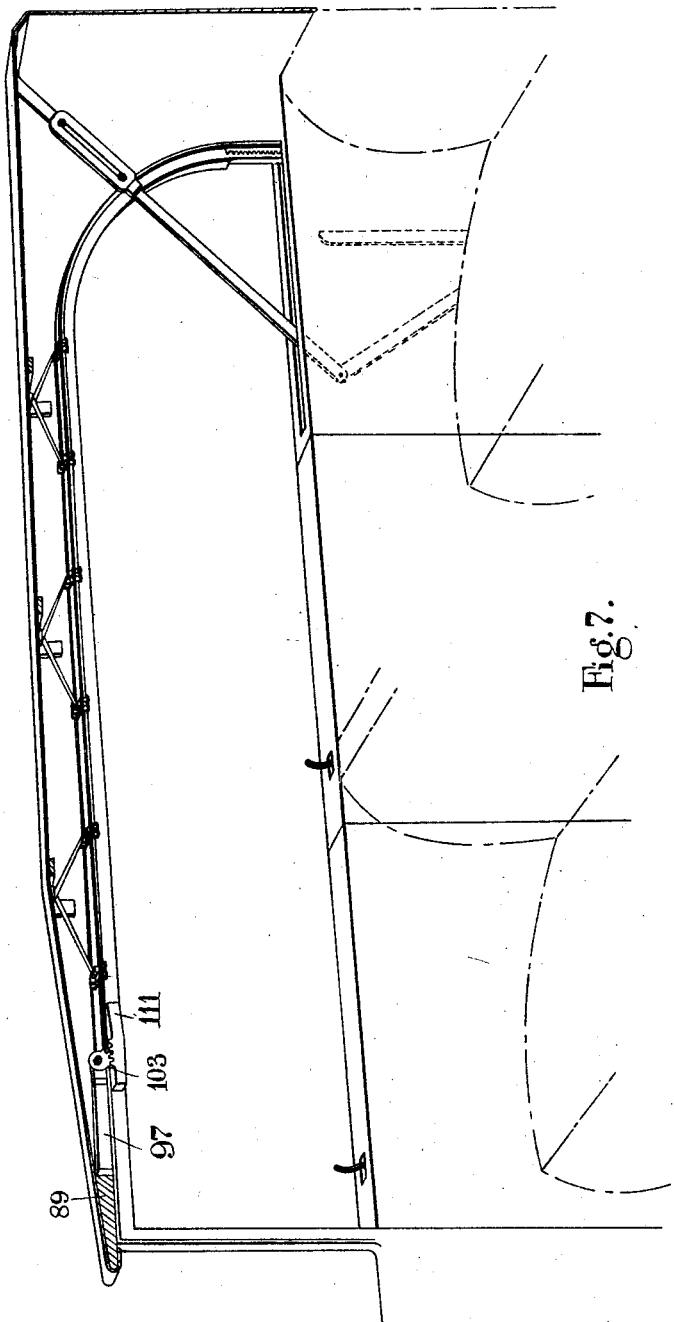
Figure 7 is an exploded view given simply to indicate the general arrangement of the hood on the vehicle body.

Referring generally to the drawings, which illustrate two alternative constructions of the peak or forward flap of the hood, as shown respectively in Figures 1 and 2, and 3 to 6, the extreme forward portion 89 of the peak may be of wood or the like rigid material. This portion is connected to the means adapted to rotate the peak or flap to bring it into the forward or rear position in raising or lowering the hood in the construction illustrated in Figures 1 and 2 by means of arms 90 comprising hinged connections 91 and 92, the pivots of which connections will be substantially vertical when the hood is raised. With these hinged connections are associated stops so that motion of the arms about their pivots is limited, at the same time allowing for movement sufficient for the hood to follow the line of the vehicle. The stops provided for limiting the motion between the arm and the fore edge of the peak are indicated by the reference characters 93 and 94, the stops for limiting the motion of the other extremity of the arm being constituted by the shoulders 95, 95ª. The fore end of he arm is connected with the rigid fore portion of the peak or flap through a fitting providing a pivotal connection about a horizontal axis 96.

In the construction illustrated in Figures 3 to 6 the arm 97 is provided with a spherical end 98 engaging a spherical recess in the fitting 99 secured to the extreme fore portion of the peak or flap, this fitting being slotted as indicated by the reference 100 to permit radial motion of the arm about the axis of the ball-and-socket joint above referred to and in the plane parallel with the median plane of the peak or flap.

The other end of the arm is engaged in the slotted member 101 and is secured therein by means of the pin 102. As will be seen, this member is provided with a toothed portion 103 which corresponds with the toothed portion indicated by the same reference in Figure 2. This toothed portion is pivotally connected by the pin 104 with the shoe 105 which is provided with a lug 106 in which a recess 107 is formed while in the element 103 a pin 108 is slidably mounted and this pin is associated with the spring 109 on which a trip member 110 is located. With this trip member an inclined surface 111 on the rack member 112 is adapted to co-operate in such manner as to ensure the operation of the clutch member to release the peak or flap when the toothed sector 103 engages the rack when raising the hood.

In Figure 2 the trip member 110 is shown in contact with the inclined surface 111 and with the toothed sector 103 at or about halfway of is engagement with the rack. Immediately prior to the engagement of the toothed sector with the rack the pin 108 will be released from the recess 107 and thus in the motion of the sector through the rack the peak or flap will be rotated in a forward and downward direction in the operation of raising the hood. In Figure 1 the peak is in position and the shoe clear of the inclined surface 111.

In lowering the hood the rack will cause the toothed sector to rotate the peak or flap until it is substantially vertical and the inclined surface 111 will then permit the spring 109 to force the pin 108 into the recess 107 and thus the flap will be retained substantially vertical during the operation of lowering the hood.

To facilitate the motion of the peak or flap about its pivotal connection with the shoes a spring 114 is provided.

On the shoe with which the arms extending from the peak are connected a tensioning means 115 for the flexible member is provided as shown in Figures 1 and 2.

In order to ensure a rigid engagement between the fore edge of the flap or peak of the hood with the cant rail when the hood is in the raised position, an L-shaped lug 116 is, as shown in Figures 2 and 3, secured to each of the arms 90 or 97 while on the cant rail a member 117 furnished with an inclined surface is provided, the member in question being adapted to be engaged by the lug as the peak is drawn forward into the position in which its extreme edge will overlap the support 118 for the wind-screen.

Having now described my invention what I claim as new and desire to secure by Letters Patent is:—

1. A hood construction comprising cant rails, hood sticks supported by said rails with which arm members are operatively associated, a peak mounted on said members which are joined thereto by a universal type joint.

2. A hood construction comprising cant rails, arm members slidable and rotatable thereon and supporting a peak through jointed connections, a toothed sector rotatable with the arm members and adapted to coact with a rack on the cant rails, and a clutch member of the pin and socket type adapted to retain the arm members in a predetermined position.

3. A hood construction according to claim 2 having a lug on the clutch member adapted to coact with a cam on one of the cant rails.

4. A hood construction according to claim 2 having springs adapted to constrain rotational movement of the peak and a lug adapted to coact with a cam on the cant rails to operate the clutch member.

5. A hood construction according to claim 2 having an inclined cam member on one of the cant rails adapted to coact with a lug operating the clutch member, springs adapted to constrain movement of the arm members and a retaining lug adapted to hold the peak in a horizontal position.

6. A hood construction comprising cant rails, hood sticks slidable on said cant rails, a peak, shoes engaging said cant rails, arms connected to the peak, a pivotal connection between said arms and each of said shoes, toothed sectors on the arms and racks on the cant rails adapted to coact with the sectors to rotate the arms about their pivotal connection with the shoes.

7. A hood construction comprising cant rails, hood sticks slidable on said cant rails, a peak, shoes engaging said cant rails, arms connected to the peak, a pivotal connection between said arms and each of said shoes, toothed sectors on the arms and racks on the cant rails adapted to coact with the sectors to rotate the arms about their pivotal connection with the shoes and a clutch member on each of the shoes adapted to retain the peak in a predetermined position.

In testimony whereof I have signed my name to this specification.

FELIX JOHN LEATHER.